(12) United States Patent
Anderson et al.

(10) Patent No.: US 9,727,858 B2
(45) Date of Patent: *Aug. 8, 2017

(54) CONFIGURABLE PAYMENT TOKENS

(71) Applicant: Visa U.S.A. Inc., San Francisco, CA (US)

(72) Inventors: Lisa Anderson, San Francisco, CA (US); Seamus Cushley, Derry (IE); Fergal Downey, Newry (IE)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,289

(22) Filed: Dec. 17, 2015

(65) Prior Publication Data
US 2016/0104153 A1    Apr. 14, 2016

Related U.S. Application Data

(63) Continuation of application No. 13/558,979, filed on Jul. 26, 2012, now Pat. No. 9,256,871.

(51) Int. Cl.
*G06Q 20/00* (2012.01)
*G06Q 20/36* (2012.01)
(Continued)

(52) U.S. Cl.
CPC ......... *G06Q 20/3672* (2013.01); *G06Q 20/12* (2013.01); *G06Q 20/227* (2013.01); *G06Q 20/3674* (2013.01); *G06Q 20/385* (2013.01)

(58) Field of Classification Search
CPC .................................................. G06Q 20/385
(Continued)

(56) References Cited

U.S. PATENT DOCUMENTS 5,613,012 A    3/1997  Hoffman
5,781,438 A    7/1998  Lee
(Continued)

FOREIGN PATENT DOCUMENTS

EP    2156397     2/2010
WO    0135304     5/2001
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Charles C Agwumezie
(74) *Attorney, Agent, or Firm* — Kilpatrick Townsend & Stockton LLP

(57) ABSTRACT

Methods and systems are disclosed for the generation and use of merchant-customizable token formats that define tokens that represent credit card and other payment numbers in online transactions. The tokens, which are used instead of the card numbers themselves for security, can be specified by the token format to have a certain number of characters, have certain fields reserved for major card identifiers, use encryption and/or randomization, be alphanumeric, and have other formatting. The customized tokens can be used with legacy equipment that uses longer or shorter card numbers than the standard sixteen-digit payment card number format and can be less likely to be recognized as related to card numbers by identify thieves.

20 Claims, 13 Drawing Sheets

(51) Int. Cl.
  *G06Q 20/12* (2012.01)
  *G06Q 20/22* (2012.01)
  *G06Q 20/38* (2012.01)

(58) Field of Classification Search
  USPC .......................................................... 705/78
  See application file for complete search history.

(56) References Cited

U.S. PATENT DOCUMENTS

| | | | |
|---|---|---|---|
| 5,826,245 A | 10/1998 | Sandberg-Diment | |
| 5,883,810 A | 3/1999 | Franklin | |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,023,682 A | 2/2000 | Checchio | |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,592,044 B1 | 7/2003 | Wong | |
| 6,636,833 B1 | 10/2003 | Flitcroft | |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,236,957 B2 | 6/2007 | Crosson Smith | |
| 7,264,154 B2 | 9/2007 | Harris | |
| 7,287,692 B1 | 10/2007 | Patel | |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,606,770 B2 | 10/2009 | Pinnell | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Hewton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,563 B2 | 2/2011 | Oder, II | |
| 7,896,238 B2 | 3/2011 | Fein | |
| 7,908,216 B1 | 3/2011 | Davis et al. | |
| 7,922,082 B2 | 4/2011 | Muscato | |
| 7,931,195 B2 | 4/2011 | Mullen | |
| 7,938,318 B2 | 5/2011 | Fein | |
| 7,954,705 B2 | 6/2011 | Mullen | |
| 7,959,076 B1 | 6/2011 | Hopkins, III | |
| 7,996,288 B1 | 8/2011 | Stolfo | |
| 8,025,223 B2 | 9/2011 | Saunders | |
| 8,046,256 B2 | 10/2011 | Chien | |
| 8,060,448 B2 | 11/2011 | Jones | |
| 8,060,449 B1 | 11/2011 | Zhu | |
| 8,074,877 B2 | 12/2011 | Mullen | |
| 8,074,879 B2 | 12/2011 | Harris | |
| 8,082,210 B2 | 12/2011 | Hansen | |
| 8,095,113 B2 | 1/2012 | Kean | |
| 8,104,679 B2 | 1/2012 | Brown | |
| RE43,157 E | 2/2012 | Bishop | |
| 8,109,436 B1 | 2/2012 | Hopkins, III | |
| 8,121,942 B2 | 2/2012 | Carlson | |
| 8,121,956 B2 | 2/2012 | Carlson | |
| 8,126,449 B2 | 2/2012 | Beenau | |
| 8,171,525 B1 | 5/2012 | Pelly | |
| 8,196,813 B2 | 6/2012 | Vadhri | |
| 8,205,791 B2 | 6/2012 | Randazza | |
| 8,219,489 B2 | 7/2012 | Patterson | |
| 8,224,702 B2 | 7/2012 | Mengerink | |
| 8,225,385 B2 | 7/2012 | Chow | |
| 8,229,852 B2 | 7/2012 | Carlson | |
| 8,265,993 B2 | 9/2012 | Chien | |
| 8,280,777 B2 | 10/2012 | Mengerink | |
| 8,281,991 B2 | 10/2012 | Wentker et al. | |
| 8,328,095 B2 | 12/2012 | Oder, II | |
| 8,336,088 B2 | 12/2012 | Raj et al. | |
| 8,346,666 B2 | 1/2013 | Lindelsee et al. | |
| 8,376,225 B1 | 2/2013 | Hopkins, III | |
| 8,380,177 B2 | 2/2013 | Laracey | |
| 8,387,873 B2 | 3/2013 | Saunders | |
| 8,401,539 B2 | 3/2013 | Beenau | |
| 8,401,898 B2 | 3/2013 | Chien | |
| 8,402,555 B2 | 3/2013 | Grecia | |
| 8,403,211 B2 | 3/2013 | Brooks | |
| 8,412,623 B2 | 4/2013 | Moon | |
| 8,412,837 B1 | 4/2013 | Emigh | |
| 8,417,642 B2 | 4/2013 | Oren | |
| 8,447,699 B2 | 5/2013 | Batada | |
| 8,453,223 B2 | 5/2013 | Svigals | |
| 8,453,925 B2 | 6/2013 | Fisher | |
| 8,458,487 B1 | 6/2013 | Palgon | |
| 8,484,134 B2 | 7/2013 | Hobson | |
| 8,485,437 B2 | 7/2013 | Mullen | |
| 8,494,959 B2 | 7/2013 | Hathaway | |
| 8,498,908 B2 | 7/2013 | Mengerink | |
| 8,504,475 B2 | 8/2013 | Brand et al. | |
| 8,504,478 B2 | 8/2013 | Saunders | |

(56) References Cited

U.S. PATENT DOCUMENTS

| | | |
|---|---|---|
| 8,510,816 B2 | 8/2013 | Quach |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0027425 A1 | 10/2001 | Davies |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin et al. |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0153417 A1 | 8/2004 | Everhart |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0016880 A1 | 1/2006 | Singer et al. |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0250290 A1* | 9/2010 | Lefkowitz ............. G06Q 10/02 705/5 |
| 2010/0258620 A1 | 10/2010 | Torreyson |
| 2010/0287085 A1 | 11/2010 | Joubert et al. |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |

(56) References Cited

U.S. PATENT DOCUMENTS

| | | |
|---|---|---|
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0153499 A1 | 6/2011 | Felsted et al. |
| 2011/0154466 A1 | 6/2011 | Harper |
| 2011/0155799 A1* | 6/2011 | Meszaros ............... G06Q 20/02 235/379 |
| 2011/0161233 A1 | 6/2011 | Tieken |
| 2011/0178926 A1 | 7/2011 | Lindelsee et al. |
| 2011/0178927 A1 | 7/2011 | Lindelsee |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0307714 A1* | 12/2011 | Comrie ............... G06F 21/6209 713/189 |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1* | 2/2012 | Basu ............... G06Q 20/02 705/67 |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0259782 A1* | 10/2012 | Hammad ............... G06Q 20/12 705/44 |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316944 A1 | 12/2012 | Patterson |
| 2012/0316992 A1 | 12/2012 | Oborne |
| 2012/0317035 A1 | 12/2012 | Royyuru |
| 2012/0317036 A1 | 12/2012 | Bower |
| 2012/0330830 A1* | 12/2012 | Mason ............... G06Q 20/36 705/41 |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |

(56) References Cited

U.S. PATENT DOCUMENTS

| | | |
|---|---|---|
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | |
|---|---|---|
| WO | 2004042536 | 5/2004 |
| WO | 2006113834 | 10/2006 |
| WO | 2009032523 | 3/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong at al., U.S. Appl. No. 14/966,943 (unpublished), Automated Access Data Provisioning filed Dec. 11, 2015.

Stubbs et al., U.S. Appl. No. 62/103.522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim el al., U.S. Appl. No. 15/004,705 (unpublished), Cloud-Based Transactions With Magnetic Secure Transmission filed Jan. 22, 2016.

Flurscheim at al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al.,, U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

(56) References Cited

OTHER PUBLICATIONS

Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Rubin et al., "Off-line generation of limited-use credit card numbers," Lecture Notes in Computer Science, FC '01 Proceedings of the 5th International Conference on Financial Cryptography 2002, pp. 196-209.
Zheng et al., "Study of mobile payments system." CEC 2003. IEEE International Conference on E-Commerce, Jun. 24-27, 2003, pp. 24-27.
Banerjee, S., et al., "A prototype design for DRM based credit card transaction in e-commerce," Ubiquity, vol. 9, issue 18, May 2008.

\* cited by examiner

302 — https://www.thirdpartytrustedserver.com/...

304

SECURE PAYMENT WEB SITE

Which of your previously-used card would you like to use?

311
- ◉ VISA  XXXX-XXXX-XXXX-1234  × Remove
- ○ VISA  XXXX-XXXX-XXXX-6122  × Remove
- ○ VISA  XXXX-XXXX-XXXX-8675  × Remove 312 — [ Enter a Different Card Number ]

[ Submit ]  [ Cancel ]

FIG. 3
(PRIOR ART)

402 — http://www.merchantwebsite.com/...

404

MERCHANT ABC

PURCHASE OF "Gadget 5000" for $59.99 — 410

Which of your previously-used card would you like to use?

411
- ◉ VISA  XXXX-XXXX-XXXX-1234  × Remove
- ○ VISA  XXXX-XXXX-XXXX-6122  × Remove
- ○ VISA  XXXX-XXXX-XXXX-8675  × Remove

[ Enter a Different Card Number ]

[ Submit ]  [ Cancel ]

CUSTOMIZE TOKEN FORMAT

USE THIS PAGE TO CUSTOMIZE THE FORMAT OF TOKENS THAT REPRESENT PAYMENT CARD ACCOUNTS.

1065 — Number of Characters: [10]
(not less than 4, not greater than 40)

1066
- ○ Use Numbers Only
- ○ Use Letters Only
- ● Use Numbers and Letters

1067
- ☑ Use character to indicate major payment network
  - Character [V] indicates VISA
  - Character [M] indicates MasterCard
  - Character [A] indicates American Express
  - Character [D] indicates Discover
  - Character [O] indicates Other 1068 — ☑ Keep last four digits of card number 1069
- ● Use random characters for remaining portion of token
- ○ Encrypt card number for remaining portion of token

PREVIEW

[ | | | ] – [ | | | ] – [ | | | ] – [1|2|3|4]

⇩

EXAMPLE [V|G|7|6|F|Z|1|2|3|4]

FIG. 10

CONFIGURABLE PAYMENT TOKENS

CROSS-REFERENCES TO RELATED APPLICATIONS

This application is a continuation of U.S. application Ser. No. 13/558,979, filed on Jul. 26, 2012, which is herein incorporated by reference in its entirety for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

Generally, the present application relates to financial data processing and presentation thereof. Specifically, methods, systems, and devices are presented for merchant-customizable token codes used for online shopping and preventing identity theft.

2. Discussion of the Related Art

Accepting credit card, debit card, prepaid card, and other payment cards is a given for many retail merchants. For online merchants, accepting PayPal® payments, Google Checkout™ payments, and other alternate electronic payment types in addition to traditional credit card payments is becoming more common. Interfacing with the plethora of payment brands that customers expect to be available for payment transactions can be daunting, especially given the regulatory burden of financial regulations, industry standards, and security considerations.

Some merchants contract with third-party payment services in order to facilitate interfacing with the different types of payment networks. CyberSource of Mountain View, Calif., is one such third party payment service.

Third-party payment services not only take care of maintaining interfaces between a contracting merchant and payment networks, they also offer other services such as risk management, hosted order pages (e.g., redirected online checkout web pages), and silent order posts (e.g., secure fields for a merchant's online checkout web page). These services are in addition to servicing the day-to-day payment transactions of merchants.

In a typical payment transaction, a merchant sends an authorization request for a customer's payment to the third-party payment service, and the third-party payment service forwards the authorization request to the proper entity. This entity often is one of many third-party vendors with which the third-party payment service contracts. The entity then obtains an approval for the authorization request—an "authorization"—from the customer's bank, etc. The authorization confirms that the customer indeed has money (or credit) in his or her account to pay for the transaction and also locks down or otherwise reserves the money (or credit) in the account.

For example, for a merchant whose bank is Wells Fargo, an authorization request for payment from a customer's Visa credit card is forwarded to Wells Fargo (i.e., the acquirer). Wells Fargo then obtains an authorization for the request through VisaNet™ from the customer's bank that issued the credit card (i.e., the issuer).

Hosted order pages and silent order posts allow a merchant to avoid collecting customers' credit card numbers and related specifics. Instead, the third-party payment service presents the credit card entry web page or fields for the user to enter his or her information. Because the merchant does not collect the information, it can avoid the burdens related to being payment card industry (PCI) data security standard (DSS) compliant.

There are difficulties associated with hosted order pages and silent order posts. For one, customers prefer a seamless interface so that it appears that he or she is not being redirected to a third party in order to make a purchase. It has also been found that seeing the order specifics on the payment page helps remind the customer of why he or she is spending money, perhaps easing the purchase along. If order specifics are to be shown on a third party web site, then that information must be packaged and sent to the third party web site. There is also the complication of robustly handling a user who clicks a Back or Cancel button on his or her web browser. With all of the difficulties, it may be easier to keep as much of the payment selections on the merchant's web site as possible.

A need exists in the art for better coordination of merchant web sites and third-party vendors that facilitate payments.

BRIEF SUMMARY

Methods and systems are disclosed for creating and using payment tokens—which represent credit card or other payment account numbers—whose format is customized. The customizable formats of the tokens can include the number of characters in the token such that the token can be a different length than the standard 16-digit format of payment cards. The format can include using a combination of letters and numbers, specifying certain characters for specific card brands, and using encryption and/or randomization for other areas of the token.

Some embodiments of the present application are related to a method of generating merchant-customizable payment tokens. The method includes receiving from a secure web site a payment account number from a customer for a first transaction with a merchant web site, retrieving a token format from a database, the token format configured by a merchant associated with the merchant web site, and generating, using at least one processor operatively coupled to a memory, a token representing the payment account number, the token including a plurality of characters, a portion of the token generated using a random number generator and a format of the token conforming with the token format. The method further includes receiving from the merchant web site an indication for a second transaction from the customer, sending to the merchant web site the token representing the payment account number, receiving a selection of the token from the merchant web site, and initiating a payment transaction using the payment account number based on the selection Some embodiments are related to a method of generating customizable payment tokens. The method includes receiving from a merchant a payment token format specifying an alphanumeric field, the token format specifying a character length of a payment token, generating, using at least one processor operatively coupled with a memory, a payment token representing a payment account number, a field of the generated token representing an encrypted portion of the payment account number and having at least one letter, the generating conducted in response to a first transaction, receiving a selection of the token from a merchant web site, and initiating a payment transaction using the payment account number based on the selection Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

BRIEF DESCRIPTION OF THE DRAWINGS

FIG. 3 illustrates a secure third-party web page for selecting a previously-used card of the prior art.

FIG. 4 illustrates a merchant web page for selecting a previously-used card in accordance with an embodiment.

FIG. 10 illustrates a token customization interface in accordance with an embodiment.

The figures will now be used to illustrate different embodiments in accordance with the invention. The figures are specific examples of embodiments and should not be interpreted as limiting embodiments, but rather exemplary forms and procedures.

DETAILED DESCRIPTION

Payment tokens whose format is customized by merchants are described. In the prior art, the focus was toward further standardization of card number formats and related payment account identifiers. The length, character set, sub-set positions, and other attributes of account identifiers were standardized in order to facilitate transactions across computer systems.

Generating a payment token that corresponds to an account number, but has no mathematical relation to the account number, is an unclassified way to refer to the account number without mentioning the account number. The token can be passed from PCI DSS-compliant parties to non-PCI DSS-compliant merchants so that the merchants can 'store' representatives of card numbers for a customer for when he or she returns.

Figure 1:
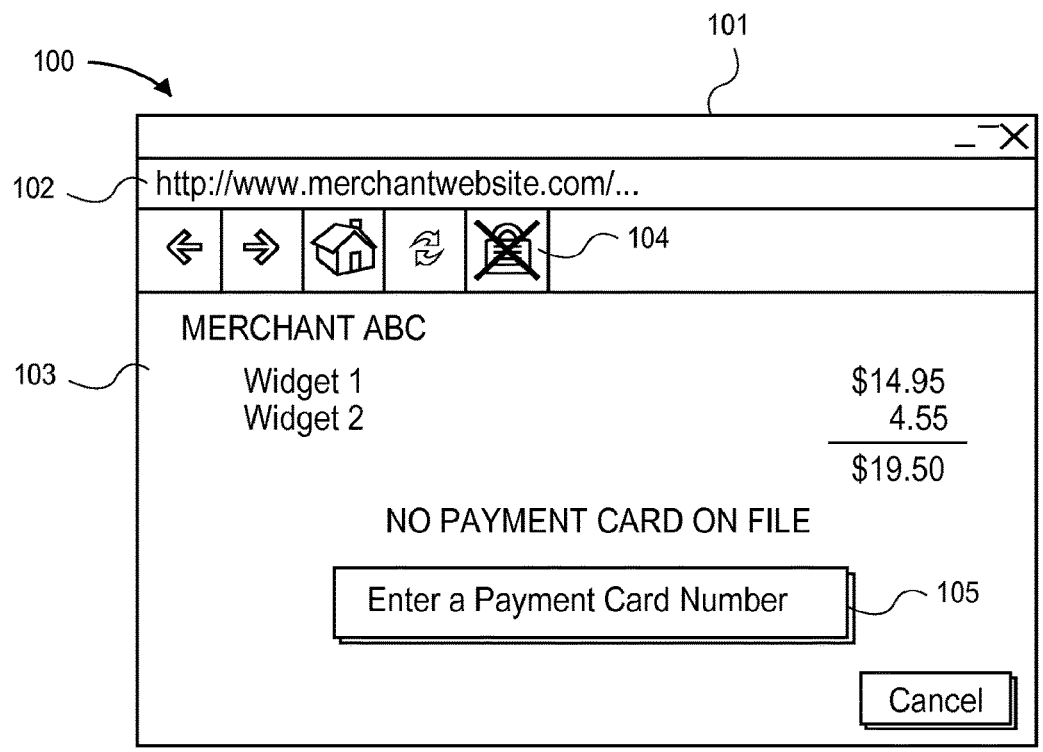
FIG. 1 illustrates a merchant shopping cart page of the prior art.

FIG. 1 illustrates a merchant shopping cart page of the prior art. A customer uses web browser 101 in order to visit merchant web site 103. In the exemplary embodiment, web site 103 is at uniform resource locator (URL) 102. Merchant web page 103 is unsecure as indicated by broken lock icon 104. At this point, the customer has merely selected some items to purchase from the web site, and no financial data has been given. Therefore, it is not necessary for the web page to be secure.

The user can click on linked button 105 in order to "check out" and give financial payment data to order the selected items. Checking out takes the customer's web browser to a secure web page of a third-party secure web site.

Figure 2:
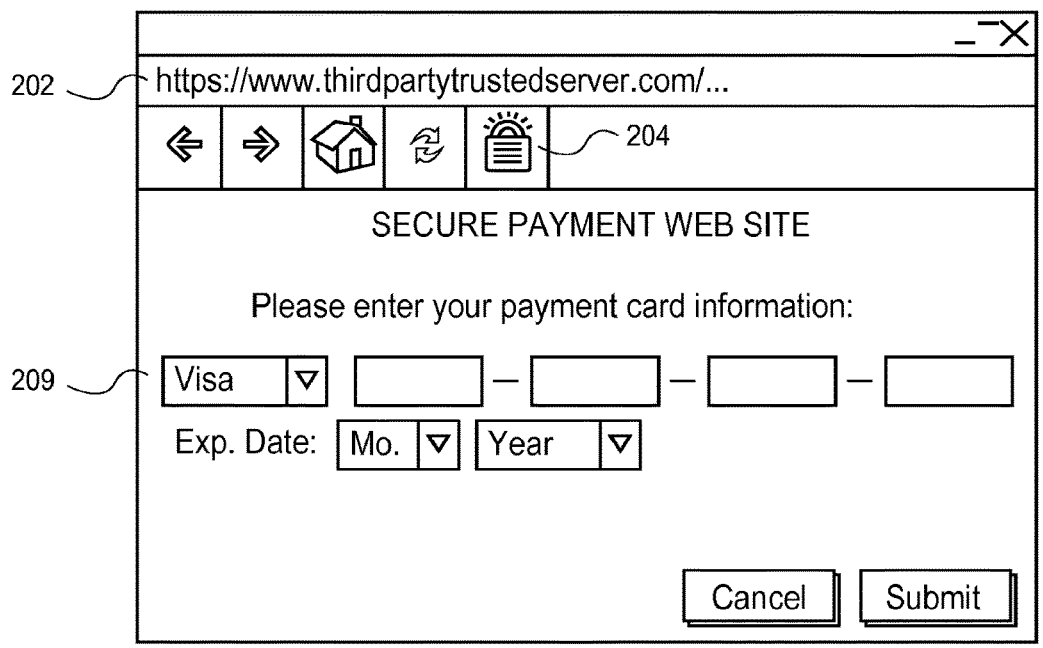
FIG. 2 illustrates a secure third-party credit card entry web page of the prior art.

FIG. 2 illustrates a secure third-party credit card entry web page of the prior art. Secure URL 202 is through a domain of the third-party, and its secure nature is indicated by lock icon 204. The user is prompted to enter his or her payment card information in entry area 209. After the user enters a credit card number and expiration date and hits the submit button, the credit card number is sent securely to the third-party, bypassing the merchant. The merchant does not need to see the credit card data, and—to avoid having to be PCI DSS-compliant—it typically does not want to see the credit card number. The merchant merely needs to be informed by the third party whether the credit card was authorized for the transaction amount.

After the customer's credit card is used for a purchase of the selected items, the credit card number is stored by the third-party web site in case the customer visits again. The customer can come back to the same merchant web site and select items for another order.

FIG. 3 illustrates a secure third-party web page for selecting a previously-used card of the prior art. After the customer has selected items from the merchant's web site, his or her web browser is redirected to the third-party secure site. URL 302, to which the customer's web browser is redirected, is a secure URL, as indicated by lock icon 304.

On the secure third-party's web site, list 311 of prior cards is presented for the user to select from. In the exemplary embodiment, the user has used three cards previously with the same merchant. To use one of the previously used cards, the user merely needs to select the radio button for the appropriate card and hit the submit button.

Additionally, linked button 312 can be pressed in order to bring up a 'new card' dialog, similar (or the same) as the web page shown in FIG. 2.

Because the third-party collects and keeps the credit card numbers, and the merchant is not privy to the card numbers, the merchant's web site is unable to provide the list of previously used credit card numbers such as list 311 in the third-party secure web site. Thus, the customer must be redirected to the third-party's secure web site at URL 302 in order to see the list of previously used payment cards. It would be useful if the list of previously used credit cards could be selected from the merchant's web site so that other details of the transaction could be shown next to the list.

FIG. 4 illustrates a merchant web page for selecting a previously-used card in accordance with an embodiment. URL 402 points to a location on the merchant's web site, and it is unsecure as indicated by broken lock icon 404. Information summary 410 about the customer's purchase is shown on the same web page as list 411 of previously used cards. The showing of previous cards as well as information on the current purchase can be accomplished by the use of tokens that represent the card number but are not actually the card number.

In the exemplary embodiment, three tokens, each representing a different, previously-used payment account, are sent from the third-party vendor to the merchant. The tokens contain the last four digits of the true card number but are otherwise each random sets of characters. The merchant can display the last four digits of the card number for the customer so that the customer can determine which card he or she would like to use for the next purchase. If the customer selects one of the cards, then the selected token can be sent back to the third-party secure web site, and the third party uses the associated card number to initiate the purchase processing.

The token formats can be customized by the merchant. For example, the length of characters of the token can be set by the merchant, or the character set can be specified.

Technical advantages of customizable, configurable payment tokens are many. Common sixteen-digit card numbers are constantly being sought by identity thieves. Sixteen-digit card numbers are relatively easy to spot as card numbers, especially if they comply with the Luhn algorithm (i.e., the "mod 10" algorithm). Numbers of lengths other than sixteen are less likely to be associated with card numbers and are thus more likely to be overlooked by thieves. If different merchants have their own, different token formats, then it is more difficult for identify thieves to identify tokens from intercepted data that relate to card numbers. Customizable card numbers also can help when using computer equipment in different countries that were once standardized on different card formats. The computer systems can be re-used to work with tokens that are formatted to the old, legacy formats instead of the new card numbers. For example, in some European countries card numbers were ten digits long. The token formats can be customized to aide internal billing practices. For example, all Visa-branded cards can include a 'V' in the first position so that employees of the merchant can track which cards are being used the most. Alphanumerics can be customized for tokens so that there is a greater character set than just the numbers from '0' to '9' in the tokens.

An "alphanumeric" field includes a field that has letters and numbers, letters only, numbers only, or as otherwise known in the art.

Figure 5:
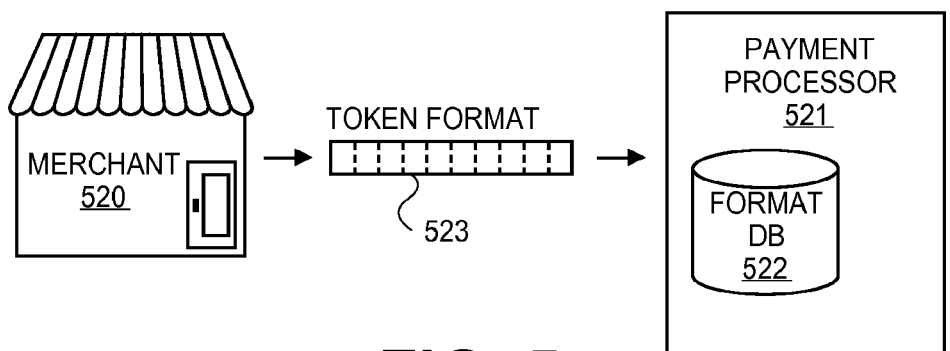
FIG. 5 illustrates a merchant defining a token format for a secure third-party in accordance with an embodiment.

FIG. 5 illustrates a merchant defining a token format for a secure third-party in accordance with an embodiment. Merchant 520 submits token format 523 to third-party payment processor 521. Token format 523 is saved by payment processor in database 522. This can be done securely through the Internet to an online web site, by way of telephone to a trusted customer service representative, or otherwise.

Figure 6:
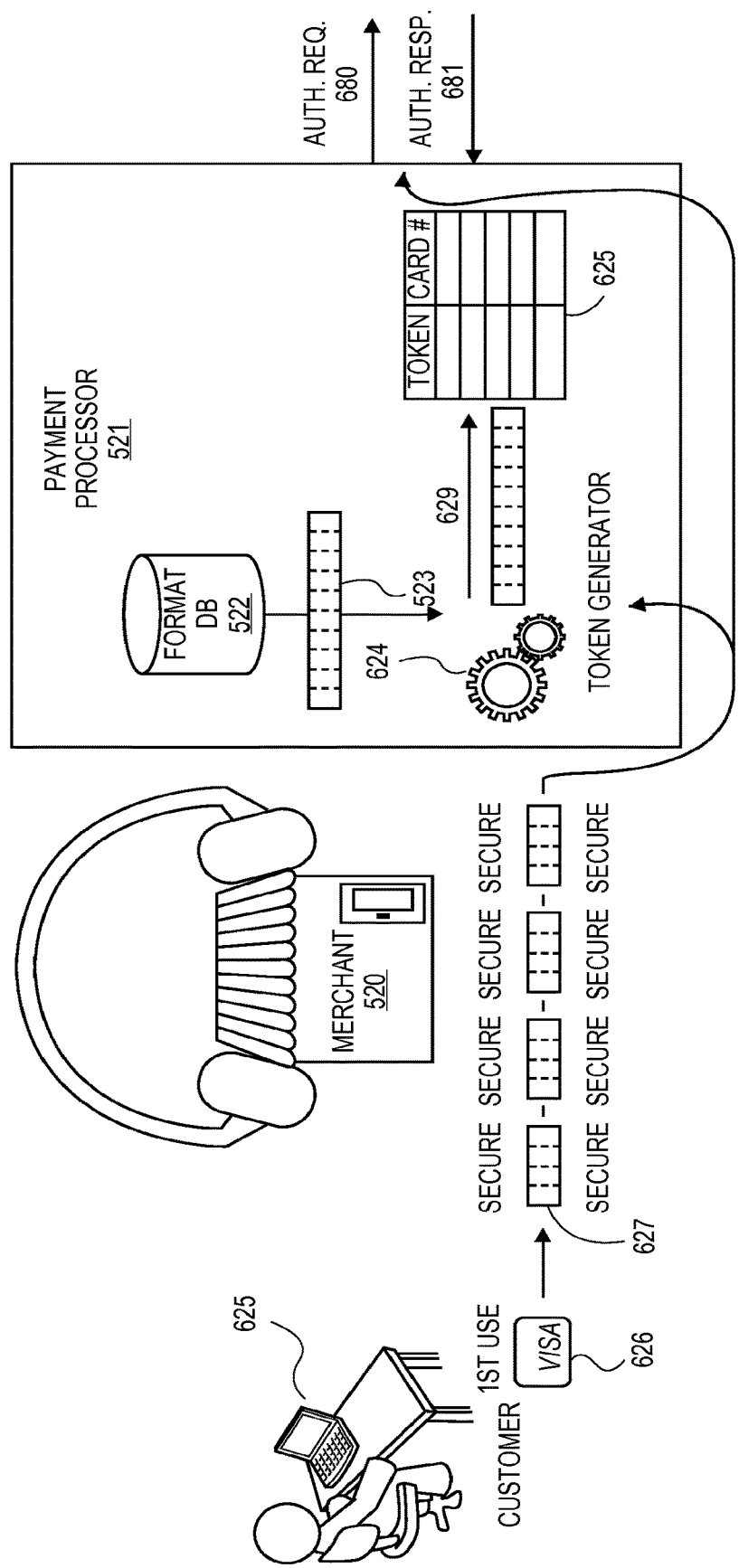
FIG. 6 illustrates a customer's submitting a credit card number to a secure third party and generation of a token in accordance with an embodiment.

FIG. 6 illustrates a customer's submitting a credit card number to a secure third party and the generation of a token in accordance with an embodiment. After a customer has selected items on merchant 520's web site, he or she selects a checkout link that takes him or her to a secure web site of third-party payment processor. The customer uses computer 625 to enter information from card 626 on the third-party's secure web site, such as card number 627. Upon submission, the user's card number 627 is received through a secure connection by payment processor 521.

Card number 627 is used to create authorization request message 680 in order to complete the present sale. Authorization response message 681 indicates whether the card payment has been accepted by an issuer. Generating the token and/or saving the token to the database can be dependent upon whether authorization response message 681 actually authorizes the purchase or not. For example, the token may only be generated if the card purchase goes through.

Upon receipt of card number 627, token generator 624 retrieves token format 523 from database 522. The token generator generates token 629, which is associated with and represents card number 627. Token 629 includes a portion generated using a random number generator so that it is not in any way mathematically related to the card number that it represents. Token 629 is saved in table 625, where its association with card number 627 is memorialized for the next time that the user orders something from the merchant.

Figure 7:
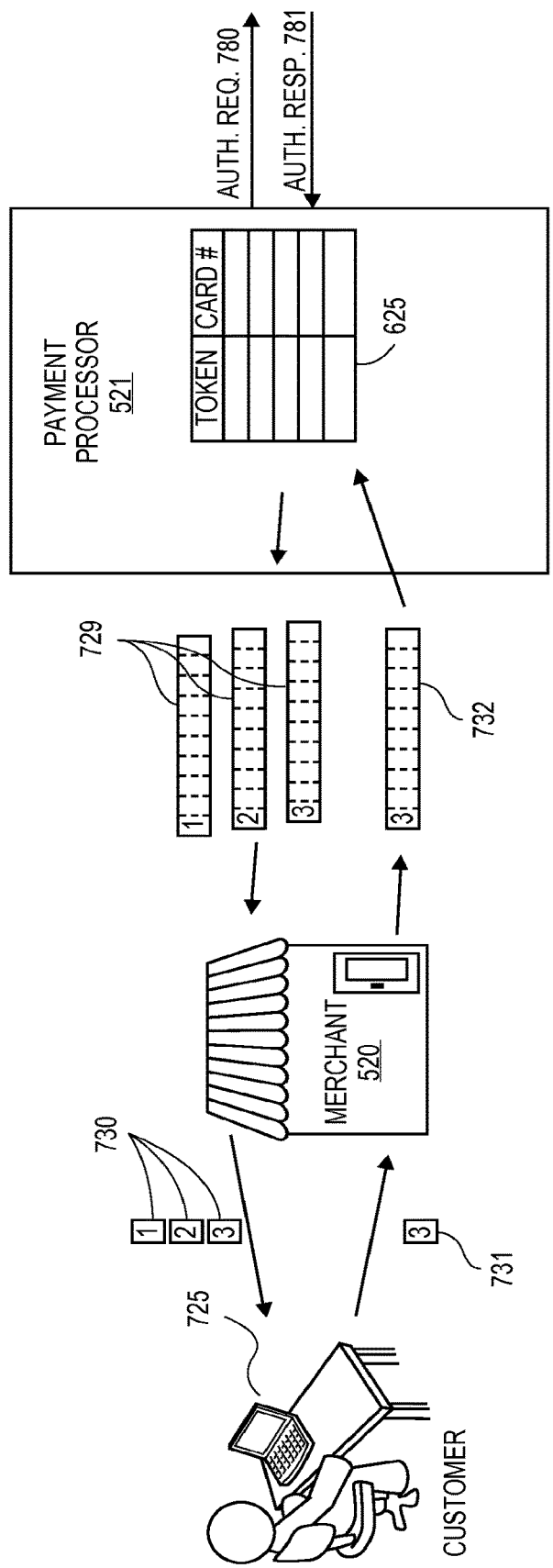
FIG. 7 illustrates a customer's selection of a token through a merchant in accordance with an embodiment.

FIG. 7 illustrates a customer's selection of a token through a merchant in accordance with an embodiment. The customer uses computer 725 to select items from merchant 520's web site and goes to the merchant's check out. The merchant requests tokens from the third-party so that it can determine the cards used for the customer's previous purchases. In the exemplary embodiment, tokens 729 that are associated with payment account numbers used in the past are sent from table 625 to merchant 520. Merchant 520 redacts the tokens (i.e., X's out all but the last four digits) and presents them as a list of options 730 to the user for using previous cards.

The customer uses his or her computer to select item 731 from list 730. Item 731 represents a previously-used credit card number. Item 731 is sent to merchant 520, where it is associated with the full token. For example, if the user selected the third item in the list of previously used payment cards, the merchant associates the selection with the third token. Selected token 732 is sent back by merchant 520 to third-party payment processor 521. The card number associated with selected token 732 is looked up in table 625, and the card number is used for payment authorization request message 780. If all goes well, then authorization response message indicates that the card purchase is (again) approved.

Note that at no time in the figure did a card number pass among the customer, merchant, and payment processor. Only ten-character tokens were used.

Figure 8:
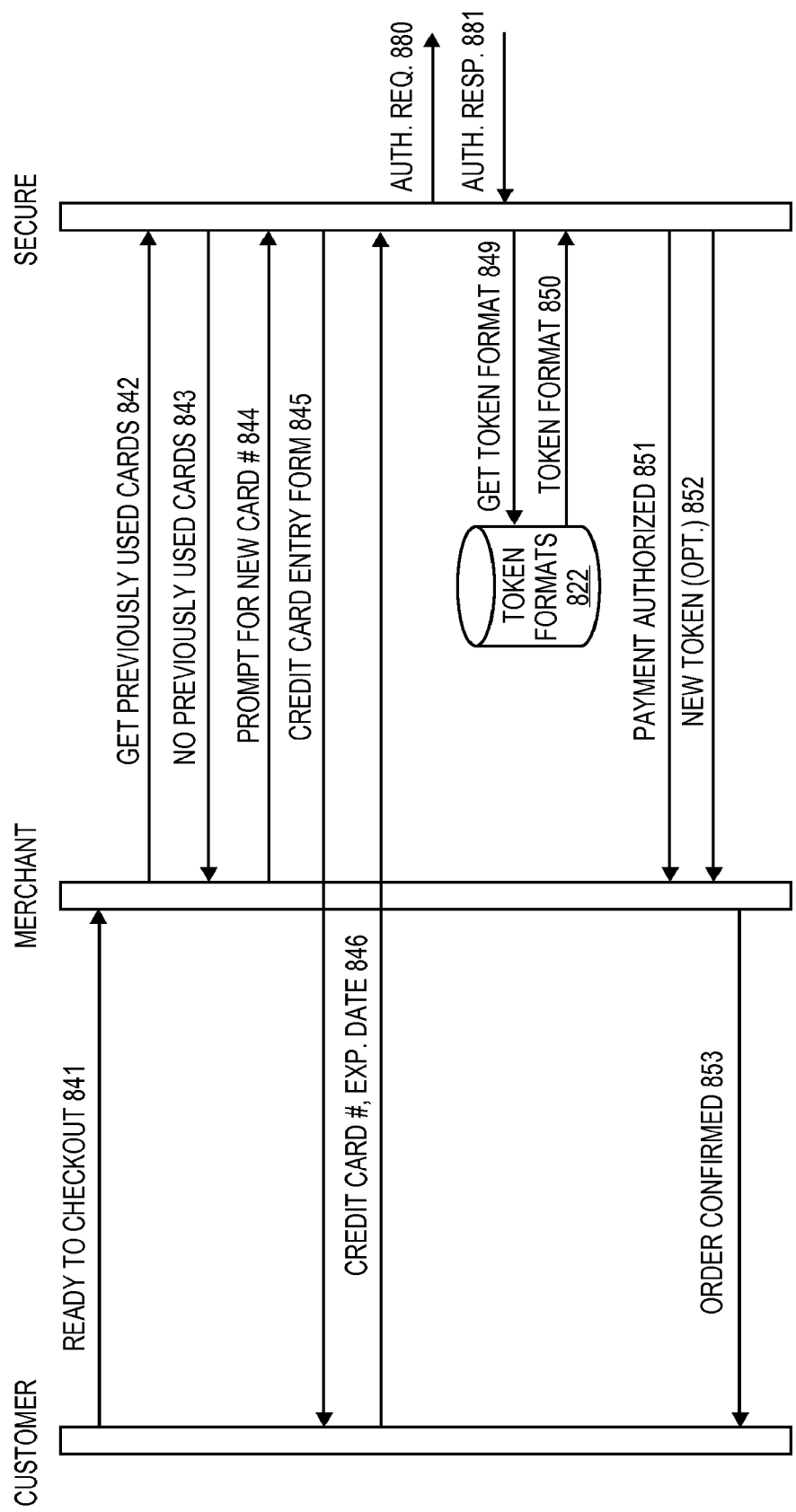
FIG. 8 is a system sequence diagram of customer's first use of a card in accordance with an embodiment.

FIG. 8 is a system sequence diagram of customer's first use of a card in accordance with an embodiment. A customer's computing device sends message 841 to a merchant, indicating that the customer is ready to check out and pay for his or her selected merchandise. In response, the merchant sends message 842 to the secure third party to get any previously used cards that the customer might have used. In this case, it is determined that the customer has not used any cards before. The third party sends message 843 back to the merchant indicating that the customer has not used any cards before. The merchant then sends message 844 to the third party requesting that it make a connection with the user and prompt the user for a (new) payment account number.

The third party sends credit card entry form 845 directly to the customer, bypassing the merchant. In response, the user dutifully types in his or her credit card number, expiration date, etc. and his or her web browser posts the information in message 846 back to the third party. The third party then uses the card number to initiate a payment transaction by way of authorization request 880. Authorization response message 881 can indicate that the payment transaction is authorized by the associated issuer.

Third party requests a token format associated with the merchant from database 822 in message 849, and token format 850 is sent back to the third party. Database 822 can be owned by the third party's, the merchant, or another party.

The fact that the payment was authorized is sent from the third party to merchant in message 851 in order to complete the current sale. Optionally, newly generated token 852 can be sent to the merchant as well. The merchant then sends order confirmation 853 to the customer so that the customer knows that the card number was valid and will be charged for the selected merchandise.

Figure 9:
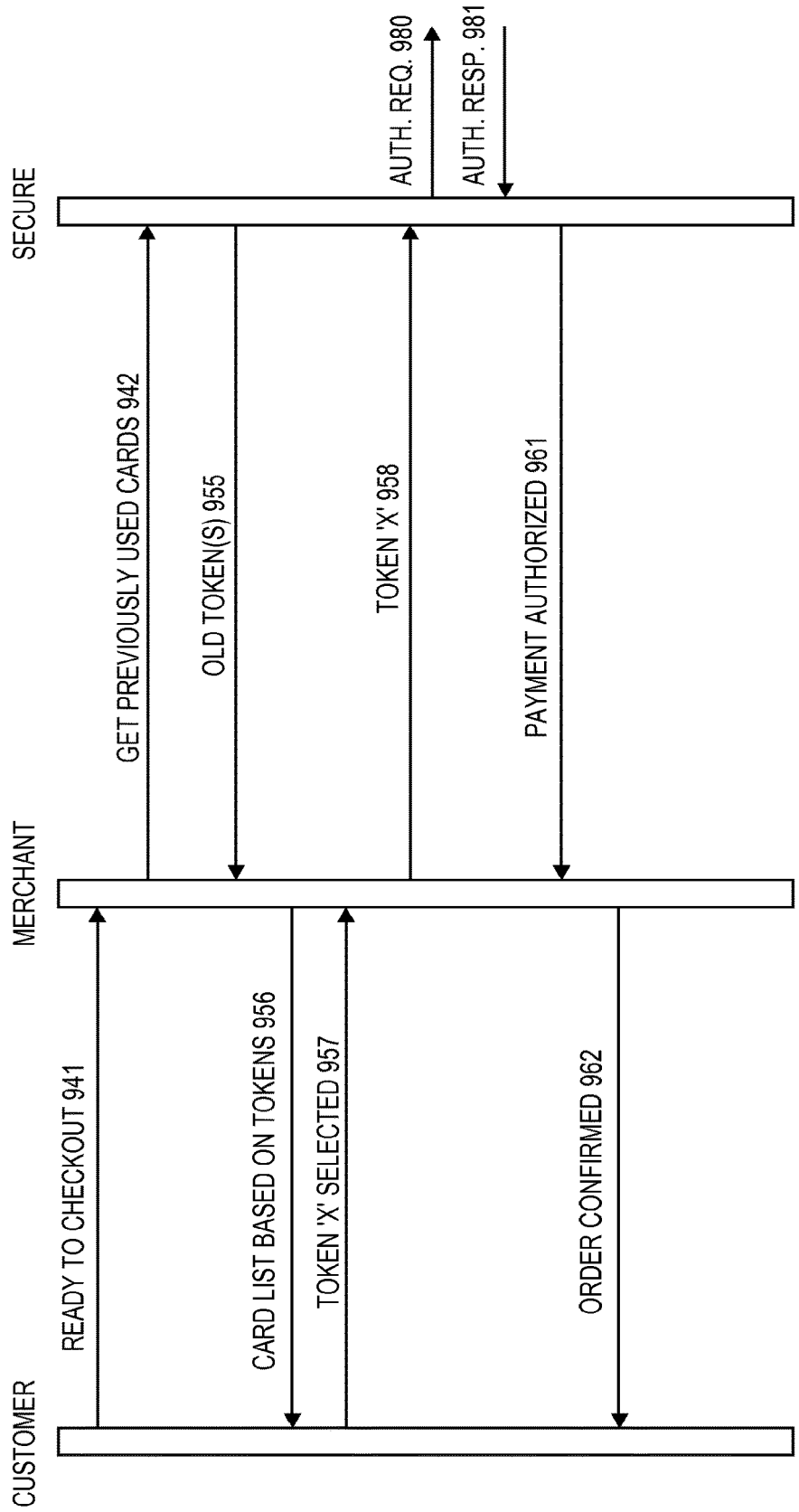
FIG. 9 is a system sequence diagram of customer's subsequent use of a card in accordance with an embodiment.

FIG. 9 is a system sequence diagram of customer's subsequent use of a card in accordance with an embodiment. A customer's computing device sends message 941 to the merchant indicating that the customer is ready to check out. In response, the merchant sends message 942 to the secure third party to get any previously used cards. In this case, it is determined that the customer has used one or more cards before with the merchant. Customized tokens 955 representing the previously-used card numbers are sent from the third party to the merchant. The merchant can then send a 'redacted' list of cards, based on the received tokens, in message 956 (e.g., a web page) to the customer. The customer can then select a particular token, and his or her browser informs merchant through message 957 (e.g., an Hypertext Markup Language (HTML) POST). Selected token 958 is sent from the merchant to the third party, and the third party initiates a transaction based on the card number associated with the token by authorization request message 980. Authorization response message 981 may be received in response, indicating that the card is accepted.

Payment authorization message 961 is sent from the third party to the merchant, and the merchant informs the user through order confirmation 962.

Note that no account number was sent among the customer, merchant, or third party in the figure. Only tokens were used. Furthermore, the customer was able to select from a list of previously used cards, recognizing the cards by the last four digits of the true card number, through the merchant even though the merchant never had possession of the full card number.

The token formats are customized for the merchant according to the merchant's preferences. The tokens are difficult for identity thieves to recognize because they are different from the standard card numbers that are used.

FIG. 10 illustrates a token customization interface in accordance with an embodiment. A merchant can select a number of characters in section 1065 of form 1000. The merchant can select whether the token will use numbers only, letters only, or numbers and letters in section 1066. In section 1067, a character can be used to indicate major payment networks. For example, a 'V' can represent Visa. Other characters can be used for other major payment networks.

The last four digits of the true card number can be replicated in the last four digits of the token in section 1068. This has become a standard way for users to recognize their own card numbers. In section 1069, the remaining portions of the token can be a random number or an encryption of the whole or part of the card number.

Figure 11:
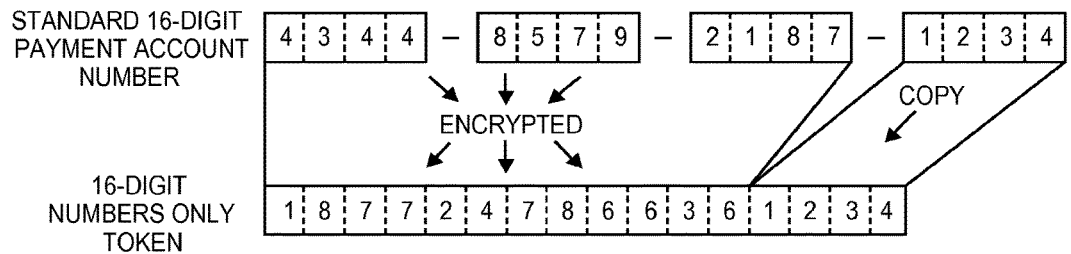
FIG. 11 illustrates a token format in accordance with an embodiment.

FIG. 11 illustrates a token format in accordance with an embodiment. The first twelve digits of a sixteen-digit card number are encrypted as other digits and pre-pended on the last four digits of the card number. This results in a sixteen-digit number that is similar in format to standard payment account numbers.

The encryption may break the checksum for card number. The checksum, calculated through the Luhn algorithm, is sometimes referred to as "mod 10 compliance," and ensures the integrity of a card number. If a hacker searches for sixteen-digit sequences of numbers that are mod 10 compliant, the hacker will not find those associated with these sixteen-digit tokens. Meanwhile, the sixteen-digit tokens can be used with legacy equipment on the merchant's end.

The first six digits of a standard sixteen-digit card number are sometimes referred to as an Issuer Identification Number (IIN) (formerly Bank Identification Number (BIN)). Like the last four digits of the card number, the IIN digits can be preserved, encrypted, or replaced with random characters.

Figure 12:
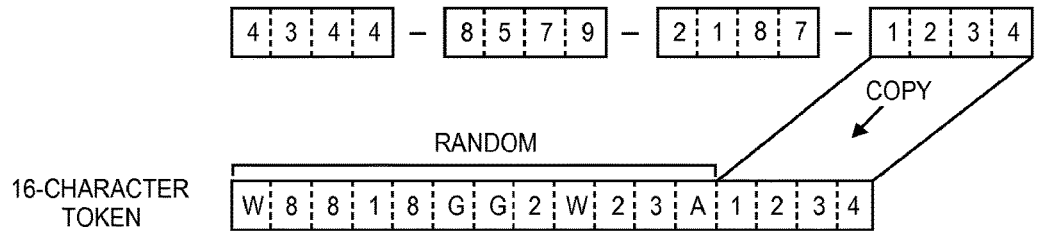
FIG. 12 illustrates a token format in accordance with an embodiment.

FIG. 12 illustrates a token format in accordance with an embodiment. The format of the token includes both numbers and letters. A random sequence of numbers and letters is generated for the first twelve characters of the token, and the last four digits are again the same digits as those in the card number.

Figure 13:
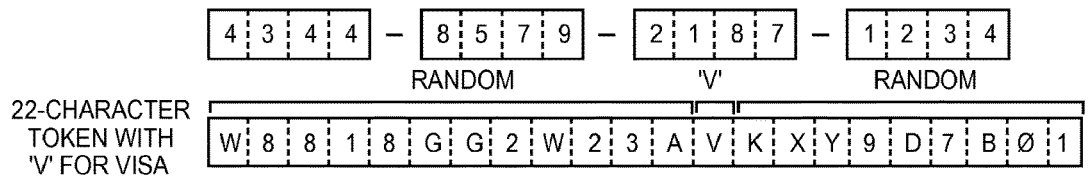
FIG. 13 illustrates a token format in accordance with an embodiment.

FIG. 13 illustrates a token format in accordance with an embodiment. A twenty-two character token includes both characters and numbers as well as a character (i.e., the thirteenth character) reserved to indicate the major payment network. The last four digits of the card number are not copied to the token.

Figure 14:
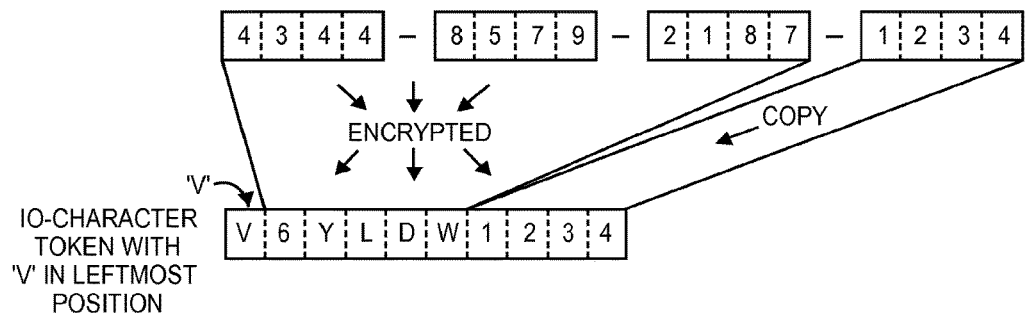
FIG. 14 illustrates a token format in accordance with an embodiment.

FIG. 14 illustrates a token format in accordance with an embodiment. The first character is reserved to indicate the major payment network, and the last four digits are those of the card number. Characters two through six of the ten-character token are an encrypted version of the first twelve digits of the card number.

Other formats are possible using different selections. For example, a merchant may wish to add mod 10 compliance to numeric tokens, or a merchant may wish for non-number and non-letter characters, such as '*,' '],' and '~,' to be available for use in the tokens. Characters can include those specified by the American Standard Code for Information Exchange (ASCII) or as otherwise known in the art.

Figure 15:
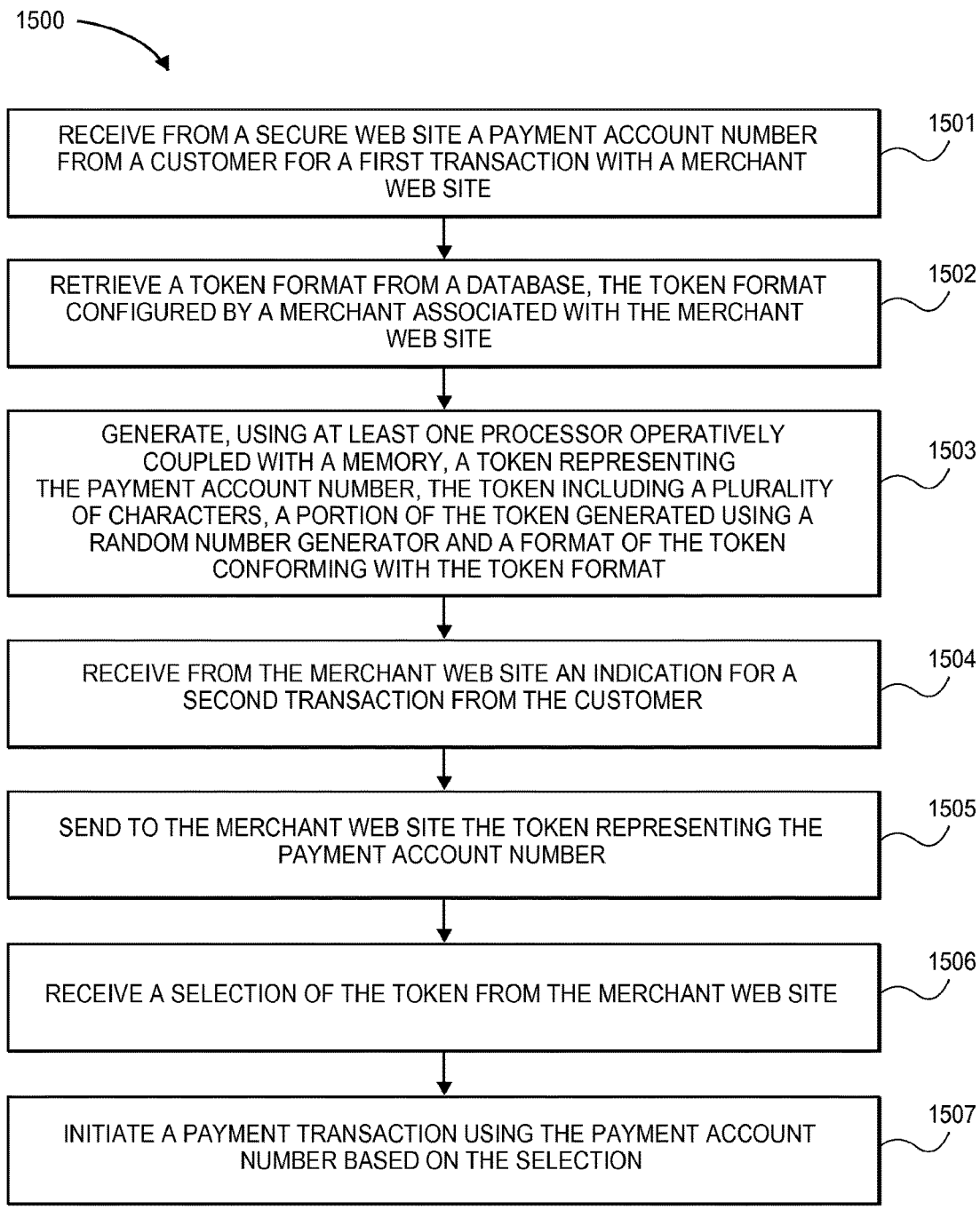
FIG. 15 is a flowchart of a process in accordance with an embodiment.

FIG. 15 is a flowchart of a process in accordance with an embodiment. Process 1500 can be implemented by a computer or other machine. In operation 1501, a payment account number from a customer for a first transaction with a merchant web site is received from a secure web site. In operation 1502, a token format is received from a database, the token format configured by a merchant associated with the merchant web site. In operation 1503, a token representing the payment account number is generated using at least one processor operatively coupled to a memory, the token including a plurality of characters, a portion of the token generated using a random number generator and a format of the token conforming with the token format. In operation 1504, an indication for a second transaction from the customer is received from the merchant web site. In operation 1505, the token representing the payment account number is sent to the merchant web site. In operation 1506, a selection of the token is received from the merchant web site. In operation 1507, a payment transaction is initiated using the payment account number based on the selection.

Figure 16:
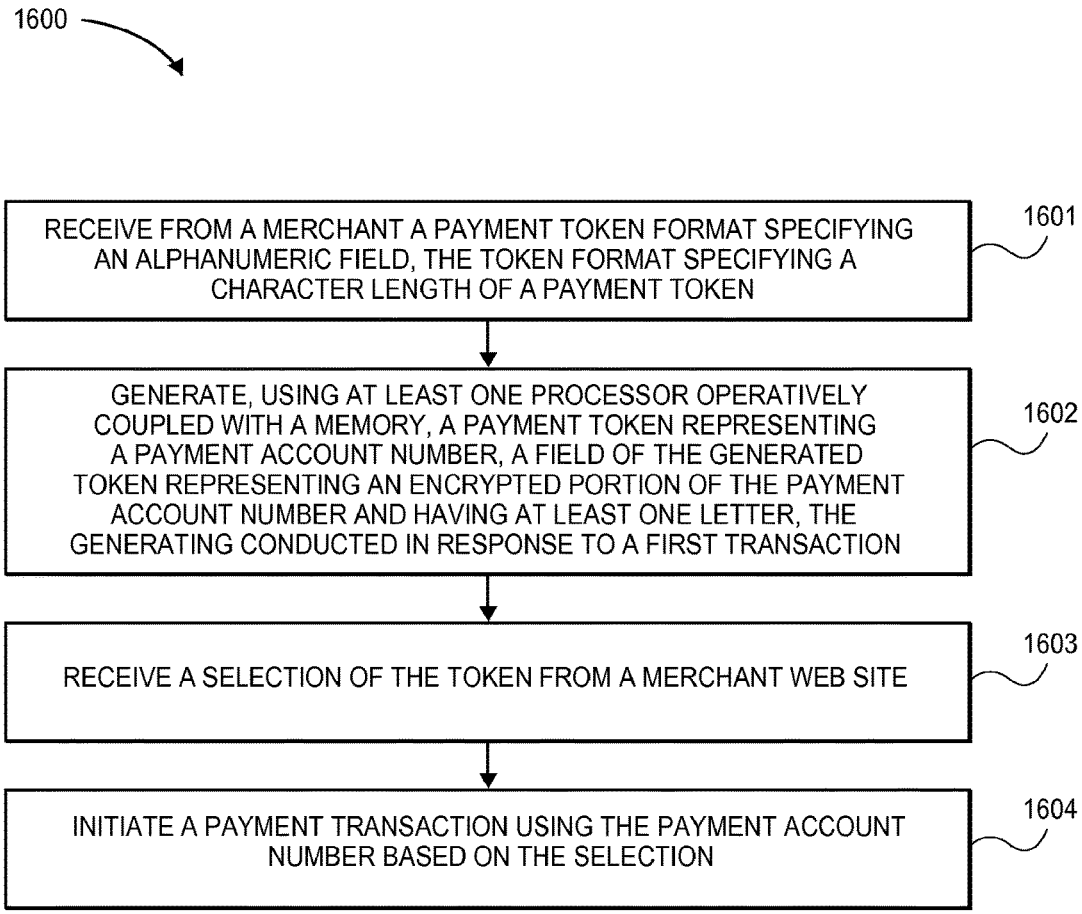
FIG. 16 is a flowchart of a process in accordance with an embodiment.

FIG. 16 is a flowchart of a process in accordance with an embodiment. Process 1600 can be implemented by a computer or other machine. In operation 1601, a payment token specifying an alphanumeric field is received from a merchant, the token format specifying a character length of a payment token. In operation 1602, a payment token representing a payment account number is generated using at least one processor operatively coupled with a memory, a field of the generated token representing an encrypted portion of the payment account number and having at least one letter, the generating conducted in response to a first transaction. In operation 1603, a selection of the token is received from a merchant web site. In operation 1604, a payment transaction is initiated using the payment account number based on the selection.

Example embodiments are typically implemented in the context of a payment transaction. Therefore, prior to further discussing exemplary systems for enriching transaction data with interchange data for transactions conducted across multiple payment processing networks, a brief description of typical payment processing using a standard payment processing system is presented below.

Figure 17:
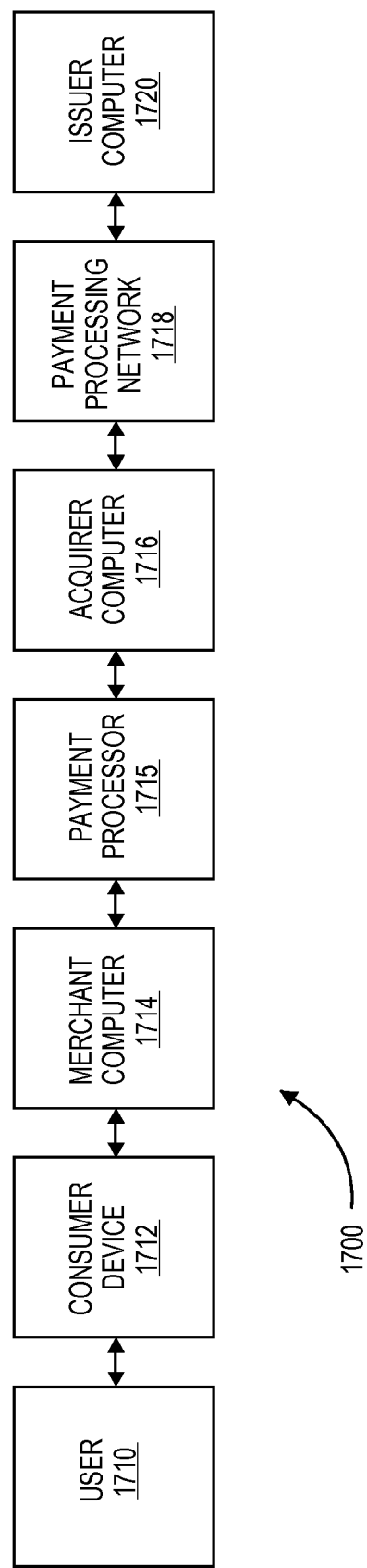
FIG. 17 illustrates payment authorization in accordance with an embodiment.

FIG. 17 illustrates payment authorization in accordance with an embodiment. A standard payment processing system 1710 may include a user 1710, a consumer device 1712, a merchant computer 1714, a payment processor 1715, an acquirer computer 1716, a payment processing network 1718, and an issuer computer 1720. In a typical purchase transaction, a user 1710 may purchase goods or services at a merchant using a consumer device 1712 such as a laptop computer, smart phone, etc.

An authorization request message may then be transmitted in response to instructions from a merchant computer 1714 from a payment processor computer 1715 to an acquirer computer 1716. After receiving the authorization request message, the acquirer computer 1716 may then transmit the authorization request message to a payment processing network 1718. The payment processing network 1718 may then forwards the authorization request message to an issuer computer 1722 associated with the portable consumer device 1712.

After the issuer computer 1722 receives the authorization request message, the issuer computer 1722 may generate and send an authorization response message to the payment processing network 1718 indicating whether or not the transaction was approved. The payment processing network 1718 may transmit the authorization response message to the acquirer computer 1716 which may then transmit the authorization response message back to the payment processor 1715.

Figure 18:
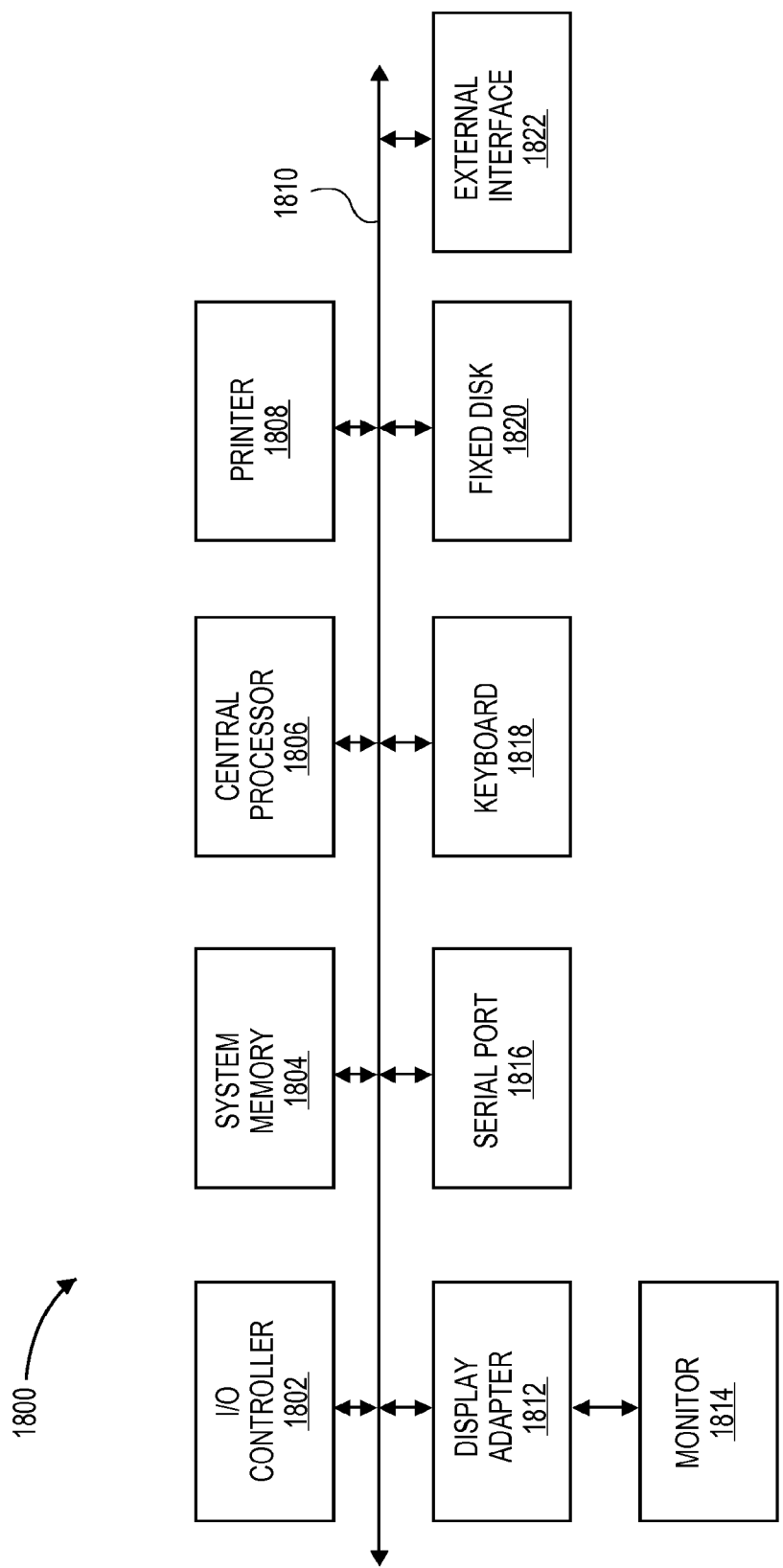
FIG. 18 shows a block diagram of an exemplary computer apparatus that can be used in some embodiments.

FIG. 18 shows a block diagram of an exemplary computer apparatus that can be used in some embodiments. The subsystems shown in the figure are interconnected via a system bus 1810. Additional subsystems such as a printer 1808, keyboard 1818, fixed disk 1820 (or other memory comprising tangible computer readable media), monitor 1814, which is coupled to display adapter 1812, and others are shown. Peripherals and input/output (I/O) devices, which couple to I/O controller 1802, can be connected to the computer system by any number of means known in the art, such as serial port 1816. For example, serial port 1816 or external interface 1822 can be used to connect the computer apparatus to a wide area network such as the Internet, a mouse input device, or a scanner. The interconnection via system bus allows the central processor 1806 to communicate with each subsystem and to control the execution of instructions from system memory 1804 or the fixed disk 1820, as well as the exchange of information between subsystems. The system memory 1804 and/or the fixed disk 1820 may embody a tangible computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a payment processor computer, via a graphical user interface on a computer operated by a user, a user-configured token format from the user;
after receiving the user-configured token format, storing, by the payment processor computer, the user-configured token format received from the user computer in a database;
after the user-configured token format is stored, receiving, by the payment processor computer, a payment account number from a customer during a first transaction with the user;
generating or receiving, by the payment processor computer, an authorization request message comprising the payment account number for a transaction conducted with a merchant;
sending, by the payment processor computer, the authorization request message comprising the payment account number to an issuer computer associated with the payment account number;
receiving, by the payment processor computer, an authorization response message comprising the payment account number and an authorization from the issuer computer;
determining whether the authorization response message contains the authorization;
after receiving the authorization response message from the issuer computer, retrieving, by the payment processor computer, the user-configured token format from the database;
generating, by the payment processor computer, a token associated with the payment account number using the retrieved user-configured token format only upon determining that the authorization response message contains the authorization, the token including a set of characters, wherein the token conforms to the user-configured token format, and wherein the token is not generated if the authorization response message does not contain the authorization; and sending, by the payment processor computer, the token associated with the payment account number to the merchant, wherein the token is thereafter stored by the merchant.

2. The method of claim 1 wherein the user-configured token format specifies a total number of characters for the tokens to be generated.

3. The method of claim 1 wherein the generating the token includes:

encrypting a portion of the payment account number; and building the token using the encrypted portion of the payment account number.

4. The method of claim 1 wherein the user-configured token format specifies one or more characters indicating a particular payment network.

5. The method of claim 1 wherein the user-configured token format specifies that only letters are in the tokens to be generated.

6. The method of claim 1 wherein the user-configured token format specifies that only numbers are in the tokens to be generated.

7. The method of claim 1 wherein the payment account number identifies an account associated with a card selected from the group consisting of a credit card, debit card, and prepaid card.

8. The method of claim 1 wherein the merchant is the user characters include only those specified by the American Standard Code for Information Exchange (ASCII).

9. The method of claim 1 wherein the generated token is not mod 10 compliant.

10. The method of claim 1 wherein the user-configured token format further specifies a position where a portion of the token is generated using a random number generator.

11. The method of claim 1 further comprising:

receiving the token at the payment processor computer;

determining, by the payment processor computer, the payment account number associated with the token;

generating, by the payment processor computer, a second authorization request message comprising the payment account number;

sending, by the payment processor computer, the second authorization request message comprising the payment account number to the issuer computer;

receiving, by the payment processor computer, a second authorization response message comprising the payment account number from the issuer computer; and sending, by the payment processor computer, a payment authorization message.

12. The method of claim 1 wherein before the user-configured token format is received, the user selects parameters for creating the user-configured token format and the graphical user interface displays a preview of an example token that has the user-configured token format.

13. The method of claim 1 wherein generating, by the payment processor computer, the token associated with the payment account number also comprises using a random number generator to generate a portion of the token.

14. The method of claim 1 wherein the graphical user interface is configured to allow the user to specify the length of characters and character set used to generate tokens using the token format, wherein the user-configured token format specifies the length and characters of the tokens to be generated.

15. The method of claim 2 wherein the specified total number of characters for the token is different than a number of total characters of the payment account number.

16. The method of claim 13 wherein the portion of the token generated using the random number generator has no mathematical relation to the payment account number.

17. The method of claim 14 wherein the graphical user interface is further configured to allow the user to specify whether the tokens to be generated are generated by using only numbers, only letters, or only numbers and letters.

18. The method of claim 17 wherein the graphical user interface is further configured to allow the user to keep the last four digits of the payment account number in subsequently generated tokens or not keep the last four digits of the payment account number in subsequently generated tokens.

19. A payment processing computer comprising:

a processor; and a non-transitory computer readable medium storing instructions, which when executed causes the processor to perform a method comprising receiving via a graphical user interface on a computer operated by a user, a user-configured token format from the user, after receiving the user-configured token format, storing the user-configured token format received from the user computer in a database, after the user-configured token format is stored, receiving a payment account number, generating or receiving an authorization request message comprising the payment account number, sending the authorization request message comprising the payment account number to an issuer computer associated with the payment account number, receiving an authorization response message comprising the payment account number and an authorization from the issuer computer for a transaction conducted with a merchant;

determining whether the authorization response message contains the authorization;

after receiving the authorization response message from the issuer computer, retrieving the user-configured token format from the database, generating a token associated with the payment account number using the retrieved user-configured token format only upon determining that the authorization response message contains the authorization, the token including a set of characters, wherein the token conforms to the user-configured token format, wherein the token is not generated if the authorization response message does not contain the authorization, and sending, by the payment processor computer, the token associated with the payment account number to the merchant, wherein the token is thereafter stored by the merchant.

20. The payment processing computer of claim 19 wherein the graphical user interface is configured to allow the user to specify the length of characters and character set used to generate tokens using the token format, wherein the user-configured token format specifies the length and characters of the tokens to be generated.

* * * * *

UNITED STATES PATENT AND TRADEMARK OFFICE
CERTIFICATE OF CORRECTION

PATENT NO. : 9,727,858 B2  
APPLICATION NO. : 14/973289  
DATED : August 8, 2017  
INVENTOR(S) : Lisa Anderson, Seamus Cushley and Fergal Downey Page 1 of 1

It is certified that error appears in the above-identified patent and that said Letters Patent is hereby corrected as shown below:

In the Claims

In Column 11, Lines 33 and 34, Claim 8, delete "characters include only those specified by the American Standard Code for Information Exchange (ASCII)"

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*